United States Patent
Chen et al.

(10) Patent No.: US 9,049,562 B2
(45) Date of Patent: Jun. 2, 2015

(54) HSS FAULT RECOVERY FOR NON-3GPP ACCESS

(75) Inventors: Ping Chen, Shanghai (CN); Jesus-Angel De-Gregorio-Rodriguez, Boadilla del Monte (ES); Cristina Ruiz Balmaseda, Las Matas (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/813,542

(22) PCT Filed: Aug. 10, 2011

(86) PCT No.: PCT/CN2011/001320
§ 371 (c)(1),
(2), (4) Date: Jan. 31, 2013

(87) PCT Pub. No.: WO2013/020249
PCT Pub. Date: Feb. 14, 2013

(65) Prior Publication Data
US 2014/0248869 A1   Sep. 4, 2014

Related U.S. Application Data

(60) Provisional application No. 61/609,033, filed on Mar. 9, 2012.

(51) Int. Cl.
*H04W 24/04* (2009.01)
*H04W 8/04* (2009.01)
(Continued)

(52) U.S. Cl.
CPC *H04W 8/04* (2013.01); *H04W 8/30* (2013.01); *H04W 12/06* (2013.01); *H04W 24/04* (2013.01)

(58) Field of Classification Search
CPC ........................................................ H04W 8/04
USPC ................................................ 455/424, 552.1
See application file for complete search history.

(56) References Cited

U.S. PATENT DOCUMENTS 6,611,685 B1 * 8/2003 Rune et al. .................... 455/433
6,788,936 B1 * 9/2004 Rune et al. .................... 455/433
(Continued)

FOREIGN PATENT DOCUMENTS

| CN | 101472263 | 7/2009 |
|---|---|---|
| WO | WO 03/039186 | 5/2003 |
| WO | WO 2009/135924 | 11/2009 |

OTHER PUBLICATIONS

International Search Report for PCT/CN2011/001320, mailed May 24, 2012.
(Continued)

*Primary Examiner* — Jinsong Hu
*Assistant Examiner* — Jean Chang
(74) *Attorney, Agent, or Firm* — Nixon & Vanderhye P.C.

(57) ABSTRACT

A method for restoring faulty subscriber-related data in an Evolved Packet System (EPS) network including a Home Subscriber Server (HSS) and a 3GPP AAA server, be characterized by comprising the following steps performed at the 3GPP AAA server: receiving an indicator from the HSS, the indicator identifying one or more subscribers having the faulty subscriber-related data stored in the HSS; and for an interaction with an access from a non-3GPP network, if the access corresponding to one of the identified subscribers, instructing the HSS to restore the faulty subscriber-related data for one or all of the identified subscribers.

16 Claims, 5 Drawing Sheets

(51) Int. Cl.
*H04W 8/30* (2009.01)
*H04W 12/06* (2009.01)

(56) References Cited

U.S. PATENT DOCUMENTS

| | | | | |
|---|---|---|---|---|
| 8,055,774 | B2* | 11/2011 | Kaura et al. | 709/226 |
| 8,442,517 | B2* | 5/2013 | Walker et al. | 455/424 |
| 8,693,423 | B2* | 4/2014 | Marsico | 370/329 |
| 2002/0068575 | A1* | 6/2002 | Agrawal et al. | 455/445 |
| 2004/0203914 | A1* | 10/2004 | Kall et al. | 455/456.1 |
| 2006/0245406 | A1* | 11/2006 | Shim | 370/338 |
| 2009/0119404 | A1* | 5/2009 | Kaura et al. | 709/226 |
| 2010/0039930 | A1* | 2/2010 | Liang et al. | 370/216 |
| 2010/0178896 | A1* | 7/2010 | Terrero Diaz-Chiron et al. | 455/405 |
| 2010/0229027 | A1* | 9/2010 | Belinchon Vergara et al. | 714/4 |
| 2011/0034157 | A1* | 2/2011 | Walker et al. | 455/417 |
| 2011/0280155 | A1* | 11/2011 | Shi | 370/254 |
| 2012/0207015 | A1* | 8/2012 | Marsico | 370/221 |
| 2014/0038565 | A1* | 2/2014 | Kurokawa et al. | 455/411 |

OTHER PUBLICATIONS

Written Opinion of the International Searching Authority for PCT/CN2011/001320, mailed May 24, 2012.

3GPP TS 29.273 V10.3.0, $3^{rd}$ Generation Partnership Project; Technical Specification Group Core Network and Terminals; Evolved Packet System (EPS); 3GPP EPS AAA interfaces, (Release 10), (Jun. 30, 2011), pp. 68-85.

3GPP TS 29.272 V10.3.0, $3^{rd}$ Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10), (Jun. 30, 2011), pp. 33-34.

3GPP TS 23.402 V10.4.0, $3^{rd}$ Generation Partnership Project; Technical Specification Group Services and System Aspects; Architecture enhancements for non-3GPP accesses (Release 10), (Jun. 2011), 231 pages.

3GPP TS 29.273 V11.0.0, $3^{rd}$ Generation Partnership Project; Technical Specification Group Core Network and Terminals; Evolved Packet System (EPS); 3GPP EPS AAA interfaces, (Release 11), Dec. 2011, pp. 1-120.

\* cited by examiner

HSS FAULT RECOVERY FOR NON-3GPP ACCESS

This application is the U.S. national phase of International Application No. PCT/CN2011/001320, filed 10 Aug. 2011, which designated the U.S. and claims the benefit of U.S. Provisional Application No. 61/609,033, filed 9 Mar. 2012, the entire contents of each of which are hereby incorporated by reference.

TECHNICAL FIELD

The present invention generally relates to non 3GPP accesses to an Evolved Network Core (EPC). More particularly, the present invention relates to methods for recovering faulty subscriber-related data stored in a Home Subscriber Server (HSS) in non-3GPP access scenarios. The present invention also relates to apparatus adapted for the same purpose.

BACKGROUND

At present, HSS supports both LTE (E-UTRAN) access and Non-3GPP access in accordance with 3GPP Evolved Packet System (EPS) specifications, which provides for mechanisms for subscription, authentication and mobility management.

In accordance with 3GPP TS 23.402 chapter 12 "Interactions between HSS and AAA Server", a 3GPP AAA can be used in Non-3GPP access scenarios to authenticate and authorize a UE connecting from a Non-3GPP access network (e.g. CDMA2000) to an EPC network via the SWx interface towards HSS. In this respect, 3GPP TS 29.273 chapter 8 "SWx description" describes the interface SWx. These 3GPP specifications are incorporated by reference in its entirety.

Figure 1:
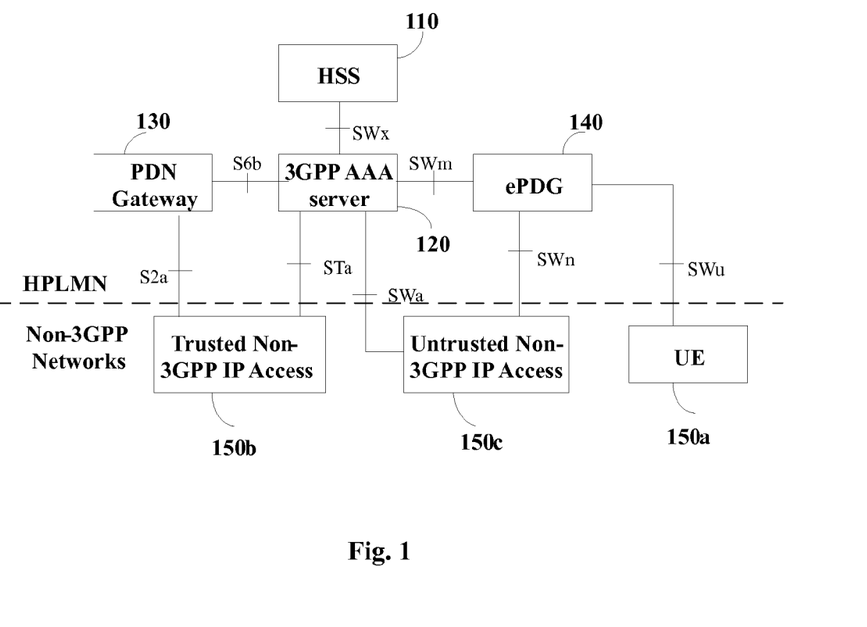
FIG. 1 shows a non-roaming architecture within EPS for non-3GPP accesses.

FIG. 1 shows a non-roaming architecture within EPS for non-3GPP accesses. As shown in FIG. 1, a HSS 110 is connected to a 3GPP AAA server 120 via an interface SWx. On the other hand, those accesses from non-3GPP networks, such as one from UE 150a, trusted non-3GPP IP access 150b and untrusted non-3GPP IP access 150c are routed to the 3GPP AAA server 120 via a number of interfaces, e.g., S6b, SWm, SWa and STa.

Conventionally through the SWx interface, 3GPP AAA retrieves security and authorization information stored in HSS. The HSS keeps track of the AAA Identity currently serving a user in the Non-3GPP access network. SWx is also used to update the HSS with PDN-GW Identity information to facilitate handover (HO) between 3GPP and Non-3GPP accesses.

When a HSS suffers a restart or data reload after failure, this HSS may lose dynamic data such as 3GPP AAA registration information for a number of users, or any PDN-GW identity used as mobility anchor for user sessions in 3GPP and Non-3GPP accesses.

In this situation, the HSS does not have valid information to identify subscribers and 3GPP AAA servers serving the subscribers, and this can cause severe consequences. A first consequence may be that the HSS can not update user contexts stored in the 3GPP AAA server or De-Register users due to administrative reasons. A second consequence may be a rejection by such HSS of subscriber profile retrieval, PDN GW Identity updates and/or Deregistration initiated from a 3GPP AAA server, especially, where there is no information or obsolete information stored in such HSS. A third consequence may be that UE authentication would be allowed if no binding information is stored, whilst there may be other 3GPP AAA server already serving the user. A still fourth consequence may be that there may be multiple 3GPP AAA servers serving a same user and this makes the situation being even worse.

However, in the Non-3GPP Access scenario, there is no fault recovery procedure between a 3GPP AAA server and a HSS when a HSS failure happens, and this will cause problems for 3GPP AAA during the UE attach, detach or handover.

SUMMARY OF THE INVENTION

In light of the above, one of the objects of the present invention is to provide a solution for HSS fault recovery which can be conveniently implemented in Non-3GPP access scenarios.

According to one aspect of the invention, a method for restoring faulty subscriber-related data in an Evolved Packet System (EPS) network including a Home Subscriber Server (HSS) and a 3GPP AAA server, be characterized by comprising the following steps performed at the 3GPP AAA server:
- receiving an indicator from the HSS, the indicator identifying one or more subscribers having the faulty subscriber-related data stored in the HSS; and
- for an interaction with an access from a non-3GPP network, if the access corresponding to one of the identified subscribers, instructing the HSS to restore the faulty subscriber-related data for the one or all of the identified subscribers.

In a preferred embodiment according to the present invention, wherein upon receiving the indicator, the method further comprising:
- marking the identified subscribers with a restoration pending flag; and
- reporting the completion of the marking to the HSS.

In a preferred embodiment according to the present invention, the method may further comprise:
- in response to a reply from the HSS that the faulty subscriber-related data has been successfully restored, clearing the restoration pending flag for the subscribers whose subscriber-related data has been successfully restored.

In a preferred embodiment according to the present invention, the indicator may be represented in form of a Push-Profile-Request (PPR) command, in which an information element "IMSI or User Id List" indicates the one or more subscribers having the faulty subscriber-related data stored in the HSS. Particularly for this embodiment, the information element "IMSI or User Id List" may contain a predefined symbol for indicating that the faulty subscriber-related data occur for all of the subscribers, and the leading digits of an IMSI for indicating that the faulty subscriber-related data occur for a set of the subscribers whose IMSIs begin with the leading digits.

In a preferred embodiment according to the present invention, the reporting step may be performed by sending a Push-Profile-Answer (PPA) command, in which an information element "Result" contains the result of the marking step.

In a preferred embodiment according to the present invention, the instructing step may be performed by sending a Server-Assignment-Request (SAR) command, in which an information element "IMSI" indicates the one or more subscribers whose subscriber-related data need to be restored, and an information element "Server Assignment Type" is set as "Restoration".

In a preferred embodiment according to the present invention, the reply from the HSS may be represented in form of Server-Assignment-Answer (SAA) command, in which an information element "IMSI" indicates the one or more subscribers whose subscriber-related data need to be restored, and an information element "Registration Result" contains the restoring result.

Particularly useful for the sake of simplicity, the SAR command, the SAA command, or both may preferably refer to just one subscriber, that is, the SAR command, the SAA command, or both may preferably just include the IMSI of one subscriber affected by restoration. Nevertheless, nothing in this specification precludes the combination of identifiers for more than one subscriber in any of the SAR command, the SAA command, or both. On the other hand, the PPR/PPA command pair can refer to a plurality of subscribers, namely those subscribers of the recovering HSS who are assumed to be served by the 3GPP AAA server.

According to another aspect of the invention, an apparatus for Access Authentication and Authorization (AAA) in an Evolved Packet System (EPS) network, be characterized by comprising:
   a communicating unit for receiving an indicator from a HSS, the indicator identifying one or more subscribers having faulty subscriber-related data stored in the HSS;
   an interacting unit for interacting with an access from a non-3GPP network; and
   a processing unit for if the access corresponding to one of the identified subscribers, instructing the HSS to restore the faulty subscriber-related data for the one or all of the identified subscribers.

According to another aspect of the invention, a method for restoring faulty subscriber-related data in an Evolved Packet System (EPS) network including a Home Subscriber Server (HSS) and a 3GPP AAA server, be characterized by comprising the following steps performed at the HSS:
   sending an indicator to the 3GPP AAA server, the indicator identifying one or more subscribers having the faulty subscriber-related data stored in the HSS; and
   upon receiving an instruction from the 3GPP AAA server, restoring the faulty subscriber-related data for one or all of the identified subscribers.

In a preferred embodiment, according to the present invention, for an interaction with an access from a non-3GPP network, if the access corresponding to one of the identified subscribers, the 3GPP AAA server may generate the instruction.

In a preferred embodiment, according to the present invention, the method may further comprise a step of:
   reporting the completion of the restoring to the 3GPP AAA server.

In a preferred embodiment, according to the present invention, the indicator may be represented in form of a Push-Profile-Request (PPR) command, in which an information element "IMSI or User Id List" indicates the one or more subscribers having the faulty subscriber-related data stored in the HSS. Particularly for this embodiment, the information element "IMSI or User Id List" may contain a predefined symbol for indicating that the faulty subscriber-related data occur for all of the subscribers, and the leading digits of an IMSI for indicating that the faulty subscriber-related data occur for a set of the subscribers whose IMSIs begin with the leading digits.

In a preferred embodiment, according to the present invention, the instruction may be represented in form of a Server-Assignment-Request (SAR) command, in which an information element "IMSI" indicates the one or more subscribers whose subscriber-related data need to be restored, and an information element "Server Assignment Type" is set as "Restoration".

In a preferred embodiment, according to the present invention, the reporting step may be performed by sending a Server-Assignment-Answer (SAA) command to the 3GPP AAA server, in which an information element "IMSI" indicates the one or more subscribers whose subscriber-related data need to be restored, and an information element "Registration Result" contains the restoring result.

According to another aspect of the invention, a Home Subscriber Server (HSS) in an Evolved Packet System (EPS) network, be characterized by comprising:
   a communicating unit for sending an indicator to the 3GPP AAA server and receiving an instruction for restoring from the 3GPP AAA server, the indicator identifying one or more subscribers having the faulty subscriber-related data stored in the HSS;
   a restoring unit for upon receiving the instruction, restoring the faulty subscriber-related data for one or all of the identified subscribers; and
   a reporting unit for generating the indicator and the restoring result.

According to another aspect of the invention, there is provided a method of fault recovery between a 3GPP AAA server and a Home Subscriber Server (HSS) in an Evolved Packet System (EPS) network, the method characterized by comprising the steps of:
   upon recovery after failure, a HSS submitting a reset indication with a Push-Profile-Request (PPR) command towards a 3GPP AAA server serving subscribers of the HSS;
   the 3GPP AAA server receiving the reset indication marking all the subscribers of the HSS as restoration pending;
   upon interaction of the 3GPP AAA server with at least one subscriber of the HSS marked as restoration pending, the 3GPP AAA server submitting a registration message with a Server-Assignment-Request (SAR) command for the at least one subscriber towards the HSS, wherein the registration message includes subscriber data, 3GPP AAA registration information, and a Server-Assignment-Type indicating restoration;
   upon receiving the registration message with the SAR command including the Server-Assignment-Type indicating restoration, the HSS restoring the subscriber data and 3GPP AAA registration information received in the registration message for the at least one subscriber;
   the HSS submitting a response message to the 3GPP AAA server with a Server-Assignment-Answer (SAA) command indicating a restoration result for the at least one subscriber; and
   the 3GPP AAA server resetting the mark of restoration pending for the at least one subscriber.

In accordance with an embodiment of the invention, upon marking all the subscribers of the HSS as restoration pending, this method may further comprise a step of confirming the restoration pending by sending a Push-Profile-Answer (PPA) command from the 3GPP AAA server to the HSS, in which an information element "Result" contains the result of the marking step.

In accordance with an embodiment of the invention, where the 3GPP AAA registration information indicates a different 3GPP AAA server than a previously registered 3GPP AAA server for the at least one subscriber, this method may further comprise a step of submitting from the HSS a de-registration message for the at least one subscriber towards the previously registered 3GPP AAA server.

In accordance with an embodiment of the invention, where a Packet Data Network Gateway (PDN GW) identity is received in the registration message, this method may further comprise a step of storing at the HSS the received PDN GW identity and, where the PDN GW identity is different than a previously stored PDN GW identity, notifying a Mobility Management Entity (MME) of the received PDN GW identity.

In accordance with an embodiment of the invention, the reset indication submitted to each 3GPP AAA server may include a set of user identities identifying subscribers served by said 3GPP AAA server. In other embodiment, the reset indication may be submitted without identifiers of subscribers for the 3GPP AAA server marking all subscribers belonging to the HSS that has submitted the reset indication as restoration pending.

According to another aspect of the invention, there is provided a Home Subscriber Server (HSS) holding subscriber data for subscribers of an Evolved Packet System (EPS) network, the HSS comprising:
- a communicating unit for submitting a reset indication with a Push-Profile-Request (PPR) command towards a 3GPP AAA server serving subscribers of the HSS, and for receiving a registration message with a Server-Assignment-Request (SAR) command for the at least one subscriber from the 3GPP AAA server, wherein the registration message includes subscriber data, 3GPP AAA registration information, and a Server-Assignment-Type indicating restoration;
- a restoring unit for restoring the subscriber data and 3GPP AAA registration information received in the registration message for the at least one subscriber; and
- a reporting unit for submitting a response message to the 3GPP AAA server with a Server-Assignment-Answer (SAA) command indicating a restoration result for the at least one subscriber.

According to another aspect of the invention, there is provided an apparatus for Access Authentication and Authorization (AAA) in an Evolved Packet System (EPS) network, the apparatus comprising:
- a communicating unit for receiving a reset indication with a Push-Profile-Request (PPR) command from a Home Subscriber Server (HSS) and for marking all the subscribers of the HSS as restoration pending;
- an interacting unit for interacting with at least one subscriber of the HSS marked as restoration pending;
- a processing unit for submitting a registration message with a Server-Assignment-Request (SAR) command for the at least one subscriber towards the HSS, wherein the registration message includes subscriber data, 3GPP AAA registration information, and a Server-Assignment-Type indicating restoration; and
- the communicating unit arranged for receiving a response message from the HSS with a Server-Assignment-Answer (SAA) command indicating a restoration result for the at least one subscriber, and for resetting the mark of restoration pending for the at least one subscriber.

According to the present invention, the HSS is able to recover the previous lost dynamic data and reduce the risks to block the following Non-3GPP IP Access/UE initiated attach, detach, additional PDN connectivity and so on procedures. Additionally, according to the present invention, the fault recovery procedure in Non-3GPP Accesses Scenario is implemented within the current 3GPP frame, and thus is easily applied.

BRIEF DESCRIPTION OF THE DRAWINGS

The foregoing and other objects, features, and advantages of the invention will be apparent from the following more particular description of preferred embodiments as illustrated in the accompanying drawings in which.

DETAILED DESCRIPTION

While the invention covers various modifications and alternative constructions, embodiments of the invention are shown in the drawings and will hereinafter be described in detail. However, it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

For illustrative purpose, the following embodiments are described in the context of the above architecture as shown in FIG. 1. However, one skilled artisan in the art would recognize that the present invention are applicable to any other architecture.

According to one embodiment of the present invention, a fault recovery procedure between 3GPP AAA and HSS is provided in case of HSS failure happens, so that, when HSS detects 3GPP AAA and UE registration is lost, it sends an indication to 3GPP AAA. Upon reception of the indication from HSS, 3GPP AAA marks all the affected subscriber records as "restoration pending flag", and thus at the next subscriber control signaling, 3GPP AAA can trigger the restoration procedure towards HSS, e.g. registration procedure to restore the registration data in the HSS.

Figure 2:
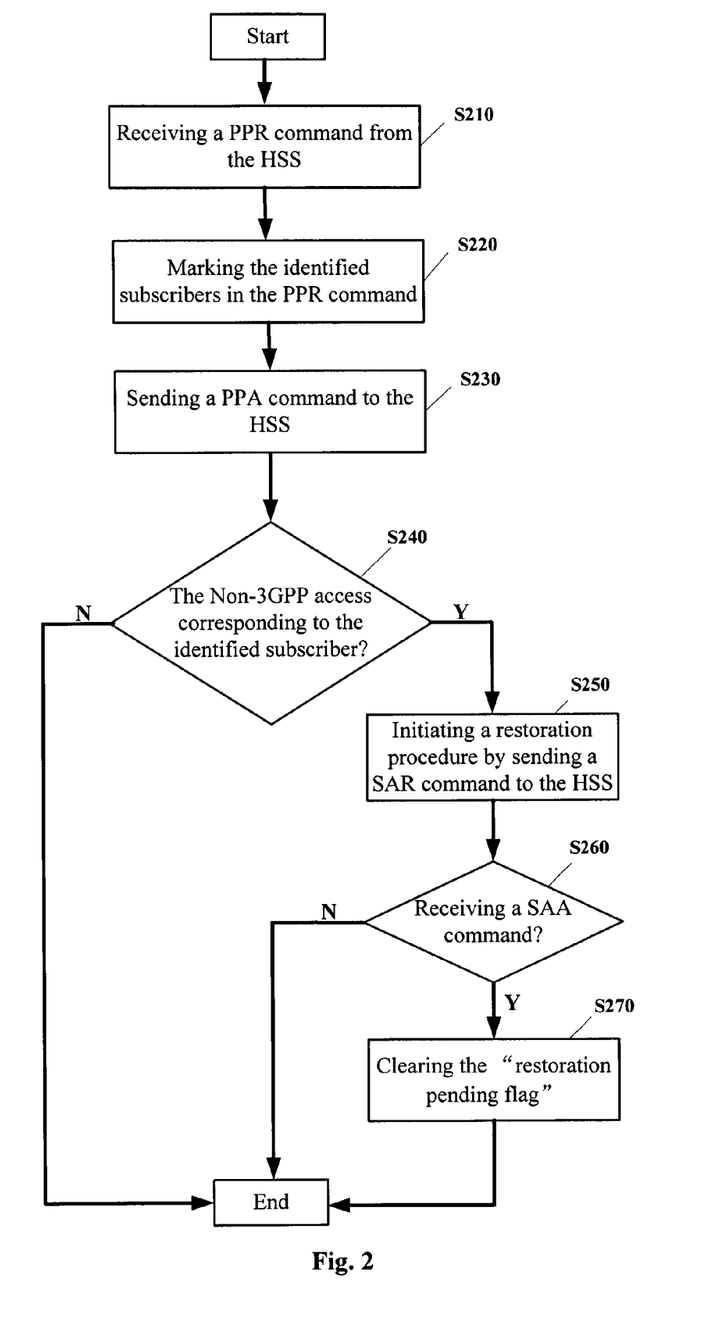
FIG. 2 is a flowchart illustrating method steps for fault recovery performed at a 3GPP AAA server according to one exemplary embodiment of the present invention.

FIG. 2 is a flowchart illustrating method steps for fault recovery performed at a 3GPP AAA server according to one exemplary embodiment of the present invention.

With reference to FIG. 2, at step S210, the 3GPP AAA server 120 as shown in FIG. 1 receives an indicator from the HSS 110 via SWx interface. The indicator identifies one or more subscribers having the faulty subscriber-related data which need to be restored. Preferably, the indicator is represented in form of a SWx command Push-Profile-Request (PPR) specified in 3GPP TS 29.273. To adapt to the reporting of a HSS failure, some modifications are made to the PPR command. An example of modified PPR command is given in Table I. For illustrative purpose, this table only shows the information elements relevant to the reporting.

Table I

| Information element name | Mapping to Diameter AVP | Cat. | Description |
|---|---|---|---|
| User Profile Update Request (PPR) | | | |
| IMSI or User Id List | User-Name | M | This information element shall contain the user IMSI, formatted according to 3GPP TS 23.003 [14], clause 2.2. For indicating that faulty data occur in HSS, this IE shall contain "*" indicating all users are affected, or the leading digits of an IMSI (i.e. MCC, MNC) and it shall identify the set of subscribers whose IMSIs begin with the User-Id if the occurred failure is limited to subscribers identified by one or more User-Ids. |
| User profile | Non-3GPP-User-Data | M | For restoration procedure, the content of this AVP may be empty. |
| Supported Features | Supported-Features | O | If present, this information element shall contain the list of features supported by the origin host. "HSS restoration procedure" is a new optional feature to be included in the Feature List for SWx. |

As shown in Table I, in normal case, the information element "IMSI or User Id List" will be formatted according to 3GPP TS 23.003, and if intending to reporting the faulty subscriber-related data in the HSS, it will contain a symbol "*" for indicating that the faulty subscriber-related data occur for all of the subscribers, and the leading digits of an IMSI for indicating that the faulty subscriber-related data occur for a set of the subscribers whose IMSIs begin with the leading digits. As for the information element "User profile", while reporting the faulty subscriber-related data, the content of this AVP may be empty. The information element "Supported Feature" contains the list of features supported by the original host. To adapt to the present invention, the reporting feature is included in the Feature List for SWx.

Then, at step 220, the 3GPP AAA server 120 marks the identified subscribers in the PPR command as those in a restoration pending status by e.g., marking all of the records corresponding to the identified subscribers with a "restoration pending flag". Note that if the received PPR command is not intended for indicating the faulty data occurring in the HSS, e.g., the PPR command is formatted according to 3GPP TS 23.003 [14], clause 2.2, the 3GPP AAA server 120 will process the command in normal mode.

At step 230, the 3GPP AAA server 120 reports the completion of the marking to the HSS 110 via SWx interface. Preferably, the reporting is performed by sending to the HSS 110 a SWx command Push-Profile-Answer (PPA) specified in 3GPP TS 29.273. Also, to adapt to the present invention, some modifications are made to the PPA command. An example of modified PPA command is given in Table II. For illustrative purpose, this table only shows the information elements relevant to the reporting.

TABLE II

| Information element name | Mapping to Diameter AVP | Cat. | Description |
|---|---|---|---|
| User Profile Update Response (PPA) | | | |
| Result | Result-Code/ Experimental-Result | M | This IE shall contain the result of the operation. The Result-Code AVP shall be used to indicate success/errors as defined in the Diameter Base Protocol. The Experimental-Result AVP shall be used for SWx errors. This is a grouped AVP which shall contain the 3GPP Vendor ID in the Vendor-Id AVP, and the error code in the Experimental-Result-Code AVP. |
| Supported Features | Supported-Features | O | If present, this information element shall contain the list of features supported by the origin host. "HSS restoration procedure" is a new optional feature to be included in the Feature List for SWx. |

As shown in Table II, the information element "Result" contains the result of the marking operation. The Result-Code AVP shall be used to indicate success/errors as defined in the Diameter Base Protocol. The Experimental-Result AVP shall be used for SWx errors. This is a grouped AVP which shall contain the 3GPP Vendor ID in the Vendor-Id AVP, and the error code in the Experimental-Result-Code AVP. The information element "Supported Feature" contains the list of features supported by the original host. To adapt to the present invention, the reporting feature is included in the Feature List for SWx.

Next, at step S240, while an interaction with an access from a non-3GPP network occurs, the 3GPP AAA server 120 determines whether the access corresponds to one of the identified subscribers, and if it is the case, the procedure proceeds to step S250, where the 3GPP AAA server 120 initiates a restoration procedure to restore the faulty subscriber-related data for one or all of the identified subscribers.

Preferably, the Restoration procedure is mapped to a pair of commands, i.e., Server-Assignment-Request/Answer (SAR/SAA), which are defined in the diameter application of SWx reference point specified in 3GPP TS 29.273. In particular, the 3GPP AAA server 120 initiates the restoration procedure by sending a registration message in form of a SAR command to the HSS 110. As a response, the HSS 110 performs a restoration operation for the faulty subscriber-related data based on the subscriber-related data and 3GPP Registration information in the received registration message and returns a command SAA to the 3GPP AAA server 120. To adapt to the present invention, some modifications are made to these commands. Examples of modified SAR and SAA commands are given in Table III and IV, respectively. For illustrative purpose, these tables only show the relevant information elements.

TABLE III

Non-3GPP IP Access Registration Request (SAR)

| Information element name | Mapping to Diameter AVP | Cat. | Description |
|---|---|---|---|
| IMSI | User-Name | M | This information element shall contain the user IMSI |
| Server Assignment Type | Server-Assignment-Type | M | This IE shall contain the type of procedure the 3GPP AAA Server requests in the HSS. In this case, this IE contains "RESTORATION" value, the HSS shall perform a restoration procedure for the subscriber and 3GPP AAA registration whenever "HSS restoration procedure" is supported by HSS. |
| Active APN | Active-APN | O | This Information Element, if present, contains the list of active APNs stored by the MME or SGSN, including the identity of the PDN GW assigned to each APN. The following information shall be present: Context-Identifier: context id of subscribed APN in use Service-Selection: name of subscribed APN in use MIP6-Agent-Info: including PDN GW identity in use for subscribed APN Visited-Network-Identifier: identifies the PLMN where the PDN GW was allocated Specific-APN-Info: list of APN-in use and related PDN GW identity when the subscribed APN is the wildcard APN It may be included if the Server-Assignment-Type is set to RESTORATION. |
| Supported Features | Supported-Features | O | If present, this information element shall contain the list of features supported by the origin host. "HSS restoration procedure" is a new optional feature to be included in the Feature List for SWx. |

TABLE IV

Non-3GPP IP Access Registration Answer (SAA)

| Information element name | Mapping to Diameter AVP | Cat. | Description |
|---|---|---|---|
| IMSI | User-Name | M | This information element shall contain the user IMSI |
| Registration Result | Result-Code/Experimental-Result | M | This IE contains the result of the operation. The Result-Code AVP shall be used for errors defined in the Diameter Base Protocol. The Experimental-Result AVP shall be used for SWx errors. This is a grouped AVP which shall contain the 3GPP Vendor ID in the Vendor-Id AVP, and the error code in the Experimental-Result-Code AVP. |
| Supported Features | Supported-Features | O | If present, this information element shall contain the list of features supported by the origin host. "HSS restoration procedure" is a new optional feature to be included in the Feature List for SWx. |

As shown in Table III, for the Restoration procedure, the information element "Server Assignment Type" in the Server-Assignment-Request (SAR) command is set as "Restoration" to inform the HSS 110 that all or some subscriber-related data need to be restored, and the information element "IMSI" indicates which subscribers whose subscriber-related data need to be restored.

As shown in Table IV, the information element "Registration Result" in the Server-Assignment-Answer (SAA) command contains the restoring result, and the information element "IMSI" indicates the subscribers to which the restoring result is directed.

At step 260, the 3GPP AAA server 120 determines whether a SAA command reporting a successful restoration is received from the HSS 110. If it is the case, the procedure proceeds to step S270.

At step S270, upon receiving the SAA command from the HSS 110, the 3GPP AAA server 120 clears the "restoration pending flag" for the records corresponding to the restored subscriber-related data.

Figure 3:
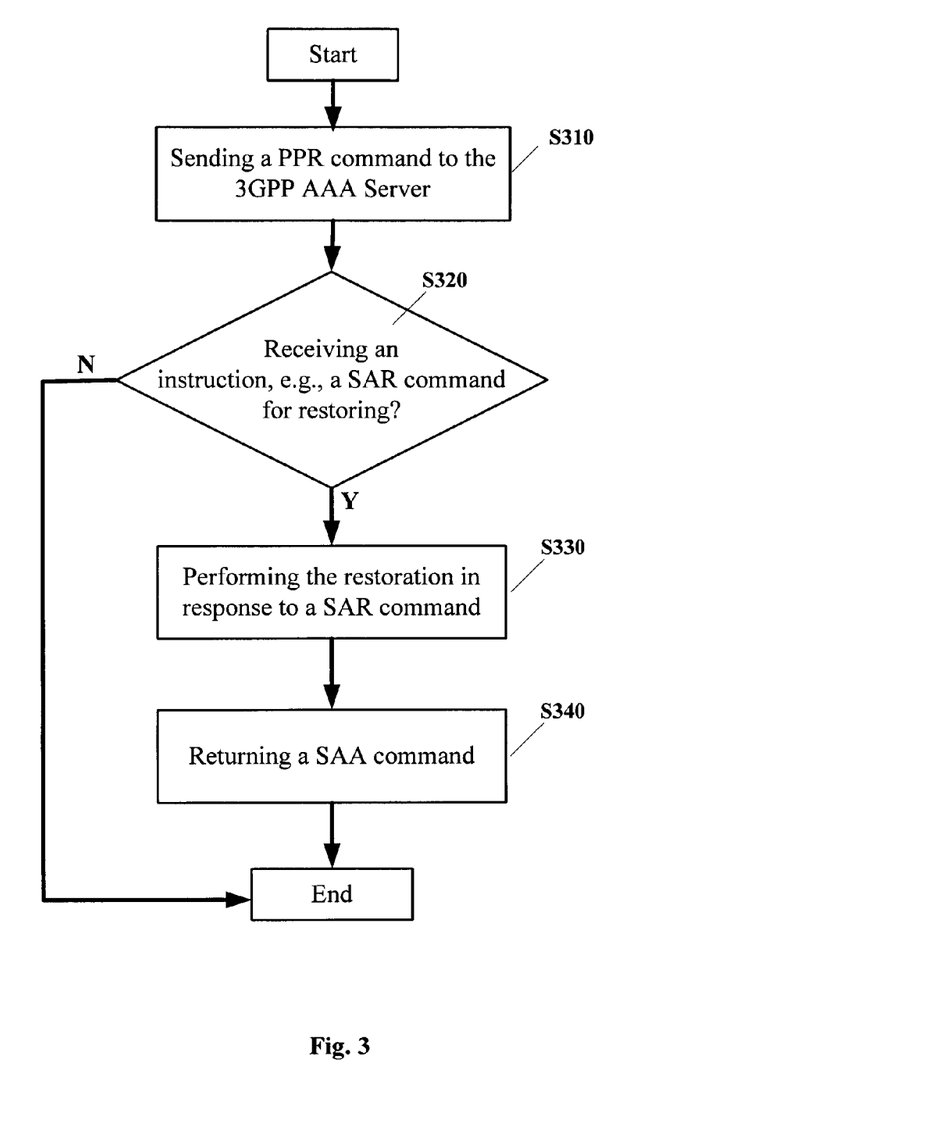
FIG. 3 is a flowchart illustrating method steps for fault recovery performed at a HSS according to one exemplary embodiment of the present invention.

FIG. 3 is a flowchart illustrating method steps for fault recovery performed at a HSS according to one exemplary embodiment of the present invention.

With reference to FIG. 3, at step S310, the HSS 110 as shown in FIG. 1 sends an indicator to the 3GPP AAA server 120 via SWx interface. As described above, the indicator is tended for identifying one or more subscribers having the faulty subscriber-related data which need to be restored, and preferably, is represented in form of a SWx command PPR as shown in Table I.

Then, at step S320, the HSS 110 determines whether an instruction for restoring is received from the 3GPP AAA server 120. If it is the case, the procedure proceeds to step S330.

At step S330, the HSS 110 performs the restoring operation in response to an instruction for restoring the faulty subscriber-related data from the 3GPP AAA server 120. Preferably, the instruction is represented as a registration message in form of a SAR command as shown in Table III and the HSS 110 restores the faulty subscriber-related data based on the subscriber-related data and 3GPP Registration information in the received registration message.

Next, at step 330, upon performing the restoration operation for the faulty subscriber-related data, the HSS 110 returns a command SAR as shown in Table IV, which indicates the restoring result and the subscribers to which the restoring result is directed.

Figure 4:
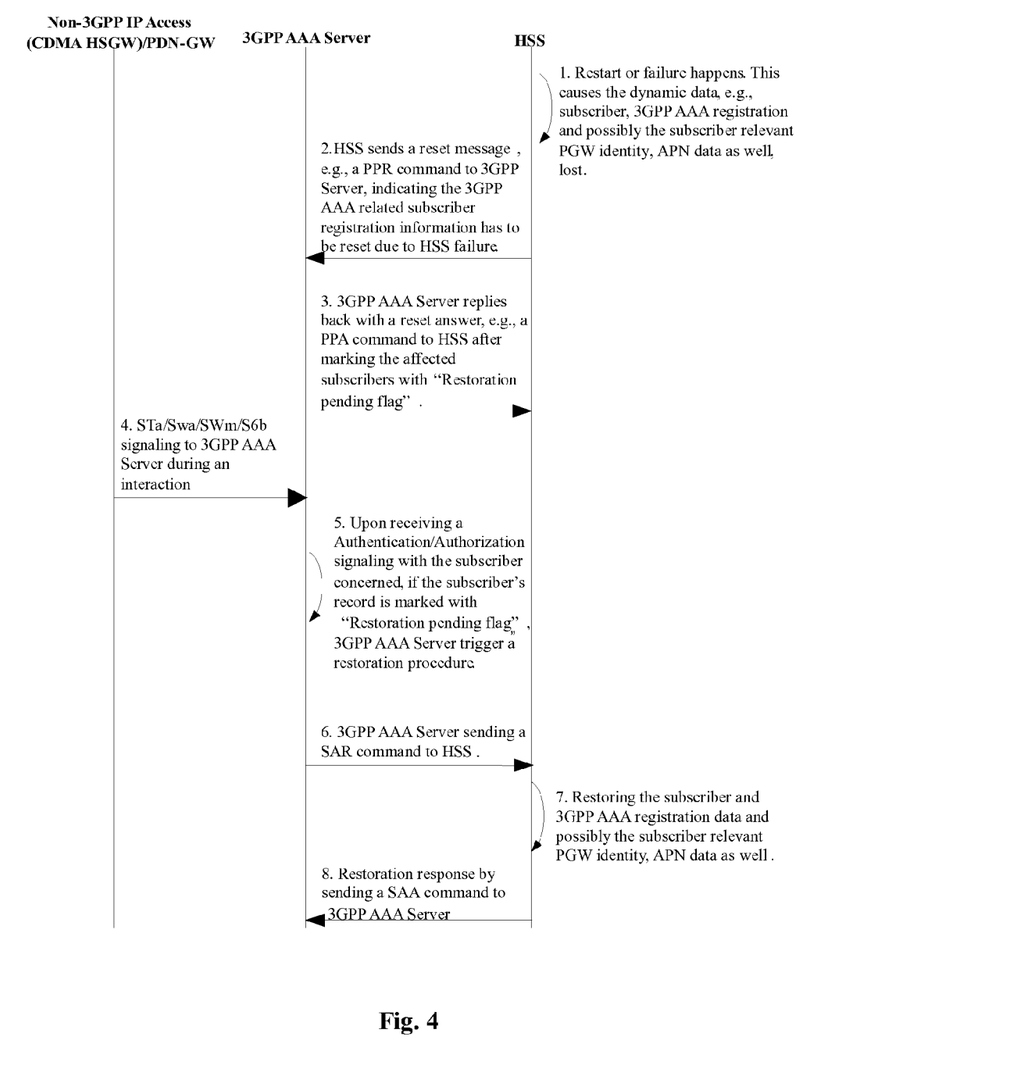
FIG. 4 shows a schematic message flow for HSS fault recovery procedure according to one exemplary embodiment of the present invention.

FIG. 4 shows a schematic message flow for HSS fault recovery procedure according to one exemplary embodiment of the present invention.

With reference to FIG. 4, at step 410, the HSS 110 determines dynamic data for a user, such as 3GPP AAA registration, may have been lost due to, e.g. un-predictable restart.

Then, at step 420, the HSS 110 sends a reset indication or an indicator towards the impacted 3GPP AAA server, e.g., 3GPP AAA server 120, which may optionally include a set of affected user identities. Preferably, the indicator is represented in form of PPR command as shown in Table I.

At step 430, upon receiving the reset indication, the 3GPP AAA server 120 marks all the affected users with a "restoration pending flag", and then replies back a reset response to the HSS 110 by returning a PPA command as shown in Table II.

At step 440, there is a STA/SWa/SWm/S6b interaction between the 3GPP AAA server and a non-3GPP IP access. Note this interaction can be triggered by the network of by the AAA (e.g. re-authorization procedure).

At step 450, the 3GPP AAA server 120 determines whether the user corresponding to the non-3GPP IP access is marked with the "restoration pending flag".

Next, at step 460, the 3GPP AAA server 120 initiates a restoration procedure via a registration message with "Server-Assignment-Type" being set as "RESTORATION".

At step 470, the HSS 110 restores the faulty subscriber-related data. In case an obsolete AAA server was registered, the HSS 110 will initiate De-registration procedure towards the obsolete AAA server. In case PDN GW identity is received, the HSS 110 will store the new information received and will notify MME only if new PDN GW Id information is included.

At step 480, after restoration, the HSS 110 will return a SAA command to the 3GPP AAA server. This indicates that the restoration procedure for certain user is finished and thus the 3GPP AAA server shall clear the "restoration pending flag" for the user.

Figure 5:
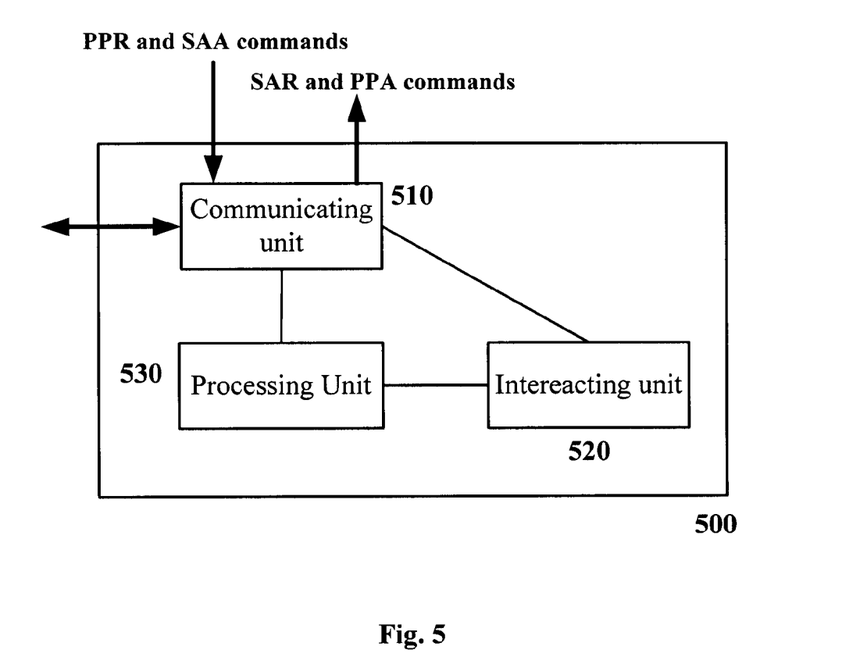
FIG. 5 is a block diagram illustrating one embodiment of an apparatus for Access Authentication and Authorization (AAA) in an Evolved Packet System (EPS) network according to the present invention.

FIG. 5 is a block diagram illustrating one embodiment of an apparatus for Access Authentication and Authorization (AAA) in an Evolved Packet System (EPS) network according to the present invention.

With reference to FIG. 5, the apparatus 500 comprises a communicating unit 510, an interacting unit 520, and a processing unit 530. The unit 510 is configured to communicate with network entities within HPLMN or non-3GPP networks, such as HSS, PDN Gateway, ePDG, trusted non-3GPP IP access point and untrusted non-3GPP IP access point. For example, it can receive a PPR or SAA command from a HSS. It can also interact with an access from a non-3GPP IP network. Moreover, this unit can send a SAR or PPA command to the HSS. The unit 520 is configured to interact with an access from a non-3GPP network. The unit 530 is configured to determine whether the access corresponds to one of the identified subscribers and to generate a SAR command instructing the HSS to restore the faulty subscriber-related data for one or all of the identified subscribers if it is the case. This unit is also configured to perform the following operations: marking the identified subscribers in the PPR command with a restoration pending flag; generating a PPA command reporting the completion of the marking; and clearing the restoration pending flag in response to a SAA command from the HSS.

Figure 6:
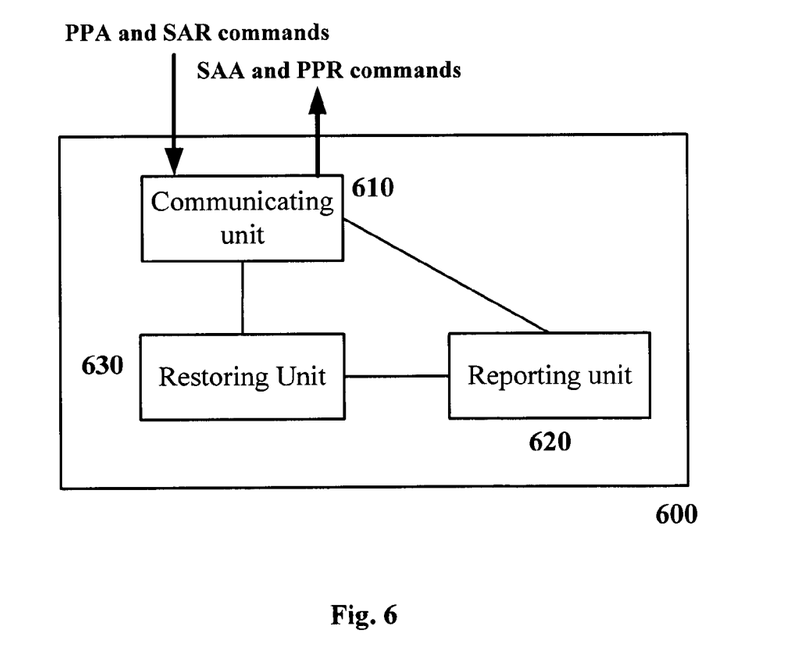
FIG. 6 is a block diagram illustrating one embodiment of a HSS in an Evolved Packet System (EPS) network according to the present invention.

FIG. 6 is a block diagram illustrating one embodiment of a HSS in an Evolved Packet System (EPS) network according to the present invention.

With reference to FIG. 6, the HSS 600 comprises a communicating unit 610, a restoring unit 620, and a reporting unit 630. The unit 610 is configured to communicate with network entities such as 3GPP AAA server. For example, it can receive a PPA or SAR command from a 3GPP AAA server. Moreover, this unit can send a PPR or SAA command to the 3GPP AAA server. The unit 520 is configured to restore the faulty subscriber-related data for one or all of the identified subscribers in response to the receipt of the SAR command from the 3GPP AAA server. The unit 530 is configured to generate the PPR and SAA commands.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for restoring faulty subscriber-related data in an Evolved Packet System (EPS) network including a Home Subscriber Server (HSS) and a 3GPP Access Authentication and Authorization (AAA), server, the method comprising the following steps performed at the 3GPP AAA server:

receiving a reset indication with a Push-Profile-Request (PPR) command from the HSS, wherein the PPR command includes an information element "User Id List" identifying one or more subscribers having faulty subscriber-related data stored in the HSS; and upon interaction with an access from a non-3GPP network, if the access corresponding to one of the identified one ore more subscribers, instructing the HSS, by sending a Server-Assignment-Request (SAR) command with an information element "Server Assignment Type" set as "Restoration", to restore the faulty subscriber-related data for the one of the identified one or more subscribers.

2. The method according to claim 1, wherein upon receiving the reset indication, further comprising:

marking the identified one or more subscribers with a restoration pending flag; and reporting the completion of the marking to the HSS, by sending a Push-Profile-Answer (PPA) command, in which an information element "Result" contains the result of the marking step.

3. The method according to claim 2, wherein further comprising:

receiving a reply from the HSS in form of a Server-Assignment-Answer (SAA) command, in which an information element "IMSI" indicates the one of the identified one or more subscribers whose subscriber-related data need to be restored and an information element "Registration Result" indicates a restoring result; and in response to the reply from the HSS that the faulty subscriber-related data has been successfully restored, clearing the restoration pending flag for the subscribers whose subscriber-related data has been successfully restored.

4. The method according to claim 1, wherein the information element "User Id List" contains a predefined symbol for indicating that the faulty subscriber-related data occur for all subscribers, or leading digits of an IMSI for indicating that the faulty subscriber-related data occur for a set of the subscribers whose IMSIs begin with the leading digits.

5. The method according to claim 1, wherein the Server-Assignment-Request (SAR) command comprises an information element "IMSI" indicating the one of the identified one or more subscribers whose subscriber-related data need to be restored.

6. An apparatus for Access Authentication and Authorization (AAA) in an Evolved Packet System (EPS) network, the apparatus comprising:
    communicating circuitry configured to receive a reset indication with a Push-Profile-Request (PPR) command from a Home Subscriber Server (HSS), wherein the PPR command includes an information element "User Id List" identifying one or more subscribers having faulty subscriber-related data stored in the HSS;
    interacting circuitry configured to interact with an access from a non-3GPP network; and
    processing circuitry configured to, if the access corresponding to one of the identified one or more subscribers, instruct the HSS, by sending a Server-Assignment-Request (SAR) command with an information element "Server Assignment Type" set as "Restoration", to restore the faulty subscriber-related data for the one of the identified one or more subscribers.

7. A method for restoring faulty subscriber-related data in an Evolved Packet System (EPS) network including a Home Subscriber Server (HSS) and a 3GPP Access Authentication and Authorization (AAA) server, the method characterized by comprising the following steps performed at the HSS:
    sending a reset indication with a Push-Profile-Request (PPR) command to the 3GPP AAA server, wherein the PPR command includes an information element "User Id List" identifying one or more subscribers having faulty subscriber-related data stored in the HSS; and
    upon receiving an instruction in form of a Server-Assignment-Request (SAR) command with an information element "Server Assignment Type" set as "Restoration", from the 3GPP AAA server, restoring the faulty subscriber-related data for one of the identified one or more subscribers.

8. The method according to claim 7, wherein further comprising:
    reporting the completion of the restoring to the 3GPP AAA server, by sending a Server-Assignment-Answer (SAA) command, in which an information element "IMSI" indicates the one of the identified one or more subscribers whose subscriber-related data need to be restored and an information element "Registration Result" contains the restoring result.

9. The method according to claim 7, wherein the information element "User Id List" contains a predefined symbol for indicating that the faulty subscriber-related data occur for all subscribers, or leading digits of an IMSI for indicating that the faulty subscriber-related data occur for a set of the subscribers whose IMSIs begin with the leading digits.

10. The method according to claim 7, wherein the Server-Assignment-Request (SAR) command comprises an information element "IMSI" indicating the one of the identified one or more subscribers whose subscriber-related data need to be restored.

11. A Home Subscriber Server (HSS) in an Evolved Packet System (EPS) network, the HSS comprising:
    communication circuitry configured to send a reset indication with a Push-Profile-Request (PPR) command to a 3GPP Access Authentication and Authorization (AAA) server, wherein the PPR command includes an information element "User Id List" identifying one or more subscribers having faulty subscriber-related data stored in the HSS, and to receive an instruction in a form of a Server-Assignment-Request (SAR) command with an information element "Server Assignment Type" set as "Restoration" from the 3GPP AAA server;
    a restoring processor configured to restore the faulty subscriber-related data for one of the identified one or more subscribers; and
    a reporting processor configured to report the completion of the restoring to the 3GPP AAA server, by sending a Server-Assignment-Answer (SAA) command, in which an information element "IMSI" indicates the one of the identified one or more subscribers whose subscriber-related data need to be restored and an information element "Registration Result" contains the restoring result.

12. A method of fault recovery between a 3GPP Access Authentication and Authorization (AAA) server and a Home Subscriber Server (HSS) in an Evolved Packet System (EPS) network, the method characterized by comprising the steps of:
    upon recovery after failure, a HSS submitting a reset indication with a Push-Profile-Request (PPR) command towards a 3GPP AAA server serving subscribers of the HSS, wherein the PPR command includes an information element "User Id List" identifying one or more subscribers having faulty subscriber-related data stored in the HSS;
    the 3GPP AAA server receiving the reset indication marking the identified one or more subscribers of the HSS as restoration pending;
    upon interaction of the 3GPP AAA server with at least one subscriber of the HSS marked as restoration pending, the 3GPP AAA server submitting a Server-Assignment-Request (SAR) command for the at least one subscriber towards the HSS, wherein the SAR command includes a Server-Assignment-Type indicating restoration;
    upon receiving the SAR command including the Server-Assignment-Type indicating restoration, the HSS restoring the subscriber data for the at least one subscriber;
    the HSS submitting a response message to the 3GPP AAA server with a Server-Assignment-Answer (SAA) command, in which an information element "IMSI" indicates the at least one subscriber whose subscriber-related data need to be restored and an information element "Registration Result" indicates a restoration result for the at least one subscriber; and
    the 3GPP AAA server resetting the mark of restoration pending for the at least one subscriber.

13. The method according to claim 12, wherein upon marking all the subscribers of the HSS as restoration pending, the method further comprises a step of confirming the restoration pending by sending a Push-Profile-Answer (PPA) command from the 3GPP AAA server to the HSS, in which an information element "Result" contains the result of the marking step.

14. The method according to claim 12, wherein the reset indication submitted to each 3GPP AAA server includes a set of user identities identifying subscribers served by said 3GPP AAA server.

15. A Home Subscriber Server (HSS) holding subscriber data for subscribers of an Evolved Packet System (EPS) network, the HSS comprising:
    communicating circuitry configured to submit a reset indication with a Push-Profile-Request (PPR) command towards a 3GPP Access Authentication and Authorization (AAA) server serving subscribers of the HSS, wherein the PPR command includes an information element "User Id List" identifying one or more subscribers having faulty subscriber-related data stored in the HSS, and to receive a Server-Assignment-Request (SAR) command for at least one subscriber from the 3GPP AAA server, wherein the SAR command includes a Server-Assignment-Type indicating restoration;
a restoring processor configured to restore the faulty subscriber-related data for the at least one subscriber; and
a reporting processor configured to submit a response message to the 3GPP AAA server with a Server-Assignment-Answer (SAA) command, in which an information element "IMSI" indicates the at least one subscriber and an information element "Registration Result" indicates a restoration result for the at least one subscriber.

16. An apparatus for Access Authentication and Authorization (AAA) in an Evolved Packet System (EPS) network, the apparatus comprising:
a communicating circuitry configured to receive a reset indication with a Push-Profile-Request (PPR) command from a Home Subscriber Server (HSS), wherein the PPR command includes an information element "User Id List" identifying one or more subscribers having faulty subscriber-related data stored in the HSS, and for marking the identified one or more subscribers of the HSS as restoration pending;
an interacting circuitry configured to interact with at least one subscriber of the HSS marked as restoration pending;
processing circuitry configured to submit a Server-Assignment-Request (SAR) command for the at least one subscriber towards the HSS, wherein the SAR command includes a Server-Assignment-Type indicating restoration; and
the communicating circuitry configured to receive a response message from the HSS with a Server-Assignment-Answer (SAA) command, in which an information element "IMSI" indicates the at least one subscriber and an information element "Registration Result" indicates a restoration result for the at least one subscriber, and configured to reset the mark of restoration pending for the at least one subscriber.

* * * * *

UNITED STATES PATENT AND TRADEMARK OFFICE
CERTIFICATE OF CORRECTION

PATENT NO.         : 9,049,562 B2                                          Page 1 of 1
APPLICATION NO.    : 13/813542
DATED              : June 2, 2015
INVENTOR(S)        : Chen et al.

It is certified that error appears in the above-identified patent and that said Letters Patent is hereby corrected as shown below:

In the Claims:

In Column 12, Line 29, in Claim 1, delete "(AAA)," and insert -- (AAA) --, therefor.

In Column 12, Line 38, in Claim 1, delete "ore more" and insert -- or more --, therefor.

In Column 12, Line 61, in Claim 3, delete "subscribers" and insert -- subscriber --, therefor.

Signed and Sealed this
Twenty-third Day of August, 2016

Michelle K. Lee
*Director of the United States Patent and Trademark Office*